(12) United States Patent
Kim et al.

(10) Patent No.: US 11,187,319 B2
(45) Date of Patent: Nov. 30, 2021

(54) METHOD FOR LEARNING POSITION OF DUAL CLUTCH TRANSMISSION GEAR MOTOR

(71) Applicant: Hyundai Kefico Corporation, Gunpo-si (KR)

(72) Inventors: Nam Hun Kim, Seoul (KR); Tae Su Kim, Suwon-si (KR)

(73) Assignee: Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 17/116,171

(22) Filed: Dec. 9, 2020

(65) Prior Publication Data
US 2021/0180688 A1 Jun. 17, 2021

(30) Foreign Application Priority Data
Dec. 13, 2019 (KR) .................. 10-2019-0167291

(51) Int. Cl.
*F16H 61/18* (2006.01)
*F16H 61/32* (2006.01)
*F16H 61/00* (2006.01)
*F16H 63/30* (2006.01)
*F16H 61/02* (2006.01)

(52) U.S. Cl.
CPC ......... *F16H 61/18* (2013.01); *F16H 61/0204* (2013.01); *F16H 61/32* (2013.01); *F16H 63/304* (2013.01); *F16H 2061/0087* (2013.01)

(58) Field of Classification Search
CPC ...... F16H 61/18; F16H 61/0204; F16H 61/32; F16H 63/304; F16H 2061/0087
See application file for complete search history.

(56) References Cited

U.S. PATENT DOCUMENTS

| 2010/0125395 A1* | 5/2010 | Horii | F16H 61/32 701/51 |
| 2016/0153552 A1* | 6/2016 | Yoon | F16H 61/32 701/62 |

FOREIGN PATENT DOCUMENTS

| JP | 2009115219 A | 5/2009 |
| JP | 2011247391 A | 12/2011 |
| JP | 5046022 B2 | 7/2012 |
| JP | 2015129582 A | 7/2015 |
| JP | 5958519 B2 | 7/2016 |
| KR | 2006-0088069 A | 8/2006 |
| KR | 20130067346 A | 6/2013 |
| KR | 2016-0032630 A | 3/2016 |

(Continued)

*Primary Examiner* — Tisha D Lewis
(74) *Attorney, Agent, or Firm* — Morgan, Lewis & Bockius LLP (57) ABSTRACT

A method for learning a reference position of a DCT gear motor is proposed. The method includes: a first voltage supply step of supplying voltage to the motor to allow the motor to rotate to a stored reference point; a second voltage supply step of repeating a process that increases the level of the voltage supplied to the motor to a higher level than the level of the voltage applied in the first voltage supply step and decreases the level, wherein the voltage is supplied to the motor to gradually increase the level thereof; a step of monitoring a position change of the motor; a step of stopping voltage supply to the motor when a temporary position change is generated in the motor to remove the temporary position change; and a step of setting the current position of the motor as a new reference point.

8 Claims, 5 Drawing Sheets

(56) References Cited

FOREIGN PATENT DOCUMENTS

| KR | 20170069535 A | 6/2017 |
| KR | 102019861 B1 | 3/2019 |

\* cited by examiner

METHOD FOR LEARNING POSITION OF DUAL CLUTCH TRANSMISSION GEAR MOTOR

CROSS REFERENCE TO RELATED APPLICATION

The present application claims priority to Korean Patent Application No. 10-2019-0167291, filed Dec. 13, 2019, the entire contents of which is incorporated herein for all purposes by this reference.

BACKGROUND OF THE INVENTION

Field of the Invention

The present disclosure relates to a method for learning a position of a dual clutch transmission gear motor and, more particularly, to a method for learning the position of a dual clutch transmission (DCT) gear motor to learn the position of a reference point of the motor through changing the level of the voltage supplied to the motor.

Description of the Related Art

In general, a DCT (Dual Clutch Transmission) means an apparatus including two clutch apparatuses disposed in an automatic transmission. Since two clutches are used, the DCT has advantages of increasing shift speed and reducing power loss. The DCT selectively transfers rotational force input from an engine to two input shafts by using the two clutches, uses the rotational force of gears disposed on the two input shafts to perform shifting, and then outputs power to two output shafts. Accordingly, in the case that a vehicle sequentially performs shifting, one of the two clutches can transfer the rotational force of the engine to a driving shaft and the other one of the two clutches can prepare for the next shift, so the shifting can be quickly performed.

Figure 1:
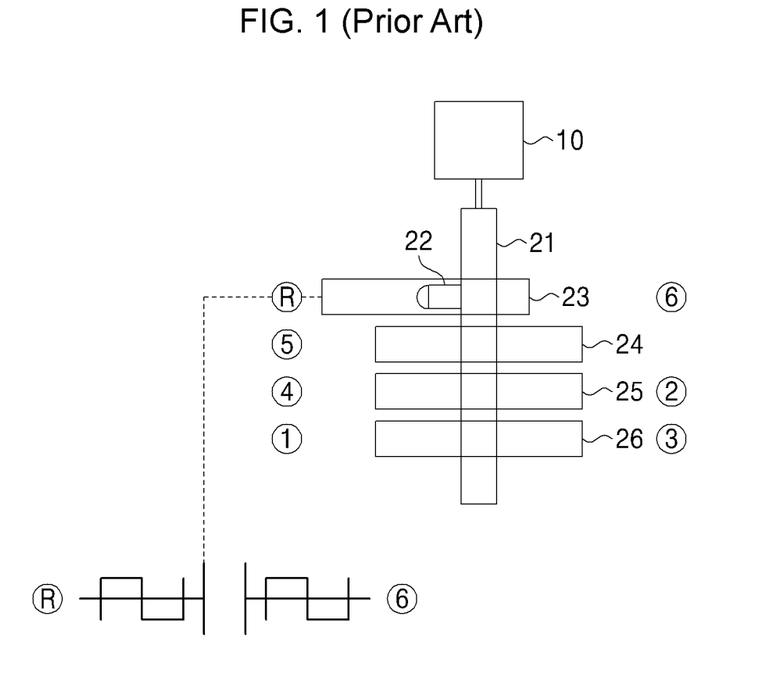
FIG. 1 is a view illustrating a general shift actuator.

On the other hands, to allow a DCT to correctly perform shifting, it is important to allow a shift actuator, which is operated by a motor to shift DCT gears, to perform engagement of a correct gear suitable for a target shift stage. FIG. 1 is a view illustrating a general shift actuator.

As illustrated in FIG. 1, a shift actuator 20 includes a shift shaft 21 connected to a motor 10 to rotate, a shift finger 22 disposed on the shift shaft 21, and a plurality of shift rails 23, 24, 25, 26. When the motor 10 rotates to a predetermined position, the shift finger 22 disposed on the shift shaft 21 selectively pushes a shift rail corresponding to a target shift stage while rotating with the motor 10. At this time, as engagement of a gear corresponding to the pushed shift rail is performed, shifting can be performed. FIG. 1 illustrates a case that a target shift stage is a rear gear (R stage).

Accordingly, for correct engagement of a shift stage, it must be assumed that the motor 10 should rotate to reach a correct position. However, the position of a reference point of the motor 10 may be changed by effects of magnetism caused by internal components of the motor, torque caused by gears and a power transfer configuration, and the like. Accordingly, to be always engaged with a correct shift stage, it is needed to continuously check and learn the position of a reference point of the motor 10.

On the other hand, recently, a sensor capable of checking the absolute position of a motor is used, but the sensor has a problem of decreasing price competitiveness of a product due to a high price. Moreover, recently, a plurality of methods for measuring a driving current of a motor to check a position change of the motor have been proposed, but it is difficult to check a correct reference point when a motor jamming phenomenon and the like occur.

SUMMARY OF THE INVENTION

The objective of the present disclosure is to provide a method for learning a reference position of a DCT gear motor, which uses the level of the voltage supplied to the motor instead of a driving current of the motor and uses a rotation amount sensor, which is relatively inexpensive, instead of an expensive absolute position sensor to perform reference point learning.

However, the effects of the present disclosure are not limited to the above-mentioned effects, and may be variously expanded within a range without departing from the spirit and scope of the present disclosure.

In order to achieve the above objective of the present disclosure a method for learning a reference position of a DCT gear motor according to exemplary embodiments of the present disclosure includes: a first voltage supply step of supplying voltage to the motor to allow the motor to rotate to a stored reference point; a second voltage supply step of repeating a process that increases the level of the voltage supplied to the motor to a higher level than that applied in the first voltage supply step and decreases the same, wherein the voltage is supplied to the motor to gradually increase the level thereof; a step of monitoring a position change of the motor; a step of, when a temporary position change is generated in the motor, stopping voltage supply to the motor to remove the temporary position change; and a step of setting the current position of the motor as a new reference point.

In the exemplary embodiments, a voltage of a constant level may be supplied to the motor in the first voltage supply step.

In the exemplary embodiments, the voltage supplied to the motor in the second voltage supply step may have the same symbol as that of the voltage supplied to the motor in the first voltage supply step.

In the exemplary embodiments, the decreased level of the voltage may be constantly maintained in the second voltage supply step.

In the exemplary embodiments, the step of monitoring the position change of the motor may be a step of measuring the relative rotation amount of the motor to the stored reference point.

In the exemplary embodiments, the method for learning the position of the DCT gear motor may further include a third voltage supply step of repeating a process that, when a permanent position change is generated in the motor, increases the level of the voltage supplied to the motor to a higher level than that of the voltage applied in the second voltage supply step and decreases the level of the voltage, wherein the voltage is supplied to the motor to gradually increase the level of the voltage. In this case, the third voltage supply step may be continued until a temporary position change is generated in the motor.

In the exemplary embodiments, the method for learning the position of the DCT gear motor may further include a safety determination step of determining whether it is safe to perform reference point learning of the motor.

In the exemplary embodiments, the safety determination step can determine that it is safe to perform the reference point learning of the motor when a target shift stage is a P-stage.

According to the exemplary embodiments of the present disclosure, a method for learning the position of the DCT gear motor can use the level of the voltage supplied to the motor to perform position learning, thereby providing advantages of not using a separate current sensor and using only an inexpensive rotation amount sensor to learn a reference point. Moreover, an effect by foreign matter, a motor jamming phenomenon, and the like can be removed through a process of increasing and decreasing the level of the voltage supplied to the motor, thereby checking a correct position of the reference point. Accordingly, price competitiveness of a product can be increased and reliability can be secured in shift control.

DETAILED DESCRIPTION OF THE INVENTION

With respect to the embodiments of the present disclosure disclosed in the text, specific structural to functional descriptions are merely illustrated for the purpose of describing embodiments of the present disclosure, embodiments of the present disclosure may be implemented in various forms and it should not be construed as limited to the embodiments described in.

Terminology such as first, second, and the like used herein may modify various components, but the terminology can be used to distinguish a component from other components and does not limit the components. For example, without departing from the scope of rights described in this document, a first component may be called a second component, and similarly, the second component may be renamed to the first component.

When a component is referred to as being "connected" or "connected" to another component, it may be directly connected to or connected to that other component, but it may be understood that other components may be present in between. When a component is said to be "directly connected" or "directly connected" to another component, it should be understood that there is no other component in between. Other expressions describing the relationship between components, such as "between" and "immediately between", "neighboring to", and "directly neighboring to" should be interpreted as well.

The terminology used herein is for the purpose of describing particular example embodiments only and is not intended to be limiting of the present disclosure. Singular expressions include plural expressions unless the context clearly indicates otherwise. In this application, the terms "comprise" or "having" are intended to indicate that there is a feature, number, step, action, component, part, or combination thereof that is described, and that one or more other features or numbers are present. It should be understood that it does not exclude the possibility of the presence or addition of steps, actions, components, parts, or combinations thereof.

Unless defined otherwise, all terms used herein, including technical or scientific terms, have the same meaning as commonly understood by one of ordinary skill in the art. Terms such as those defined in the commonly used dictionaries should be construed as meanings consistent with the meanings in the context of the related art and shall not be construed in ideal or excessively formal meanings unless expressly defined in this application.

Hereinafter, with reference to the drawings, a preferred embodiment of the present disclosure will be described in detail. The same reference numerals are used for the same components in the drawings and duplicate descriptions of the same components are omitted.

First, a device 100, as illustrated in FIG. 1, for learning the position of a reference point of a DCT gear motor 10 will be described.

Figure 2:
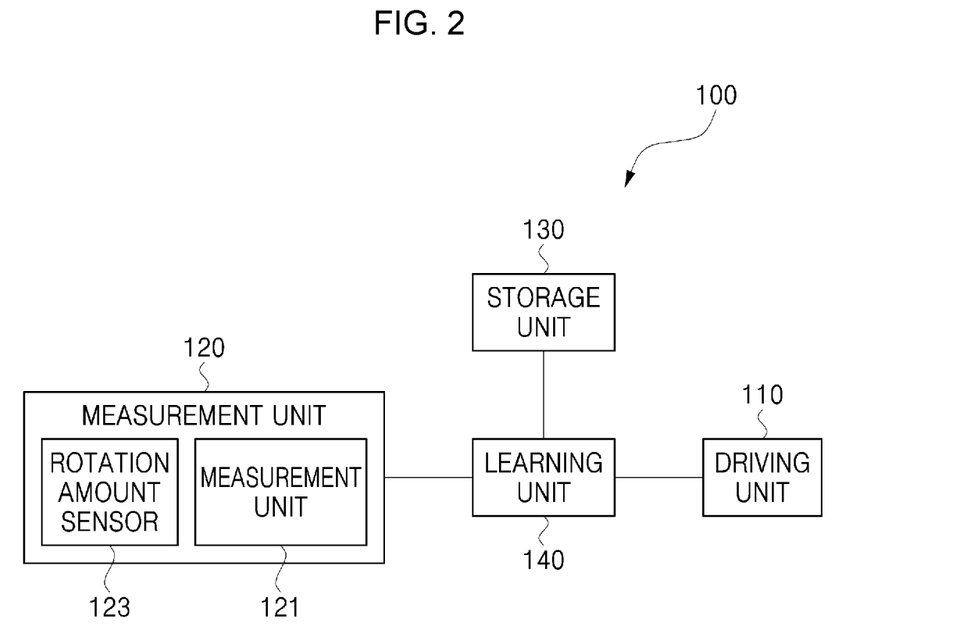
FIG. 2 is a block diagram illustrating a position learning device of a DCT motor according to the present disclosure.

FIG. 2 is a block diagram illustrating a device for learning the position of the DCT gear motor of the present disclosure.

With reference to FIG. 2, the device for learning the position of the DCT gear motor includes: a driving unit 110 supplying a driving voltage to the motor 10; a measurement unit 120 monitoring the level of the driving voltage and a position change of the motor 10; a storage unit 130 storing reference point information of the motor 10; and a learning unit 140 performing reference point learning of the motor 10.

The driving unit 100 can supply a driving voltage to the motor 10 to perform engagement of a gear suitable for a target shift stage. At this time, the final position (rotation amount) of the motor 10 can be changed in accordance with time that the driving unit 110 supplies voltage to the motor 10. In other words, the driving unit 110 adjusts a voltage supply time for the motor 10 to perform engagement of a specific shift stage.

The measurement unit 120 includes a voltage sensor 121 measuring the level of the voltage supplied to the motor 10 and a rotation amount sensor 123 measuring a change in the rotation amount of the motor 10.

The voltage sensor 121 can measure the level of the voltage supplied from the driving unit 110 to the motor 10 to transmit the measured level to the learning unit 140.

The rotation amount sensor 123 can measure and transmit the rotation amount of the motor 10 to the learning unit 140. For example, the rotation amount sensor 123 may be a Hall sensor. The Hall sensor counts the moment when a rotational shaft of the motor 10 passes through a Hall device to measure the relative rotation amount of the motor 10. For example, the rotation amount sensor 123 can measure the relative rotation amount of the motor 10 to the position of a specific shift stage or the existing reference point to be described. In other words, the present disclosure uses an inexpensive Hall sensor instead of an absolute position sensor to perform position learning of the motor 10. Measured rotation amount information of the motor 10 can be provided to the learning unit 140.

The storage unit 140 can store reference point position information of the motor 10 and position information corresponding to each shift stage. At this time, the position information corresponding to the shift stage may be a relative position to the reference point.

On the other hand, a large number of devices except for an engine and a transmission exist in an engine room of a vehicle. Accordingly, in the case of the DCT gear motor 10, spatial restriction exists and a rotation range thereof also exists. Accordingly, the position of the reference point of the motor 10 may mean a position where the motor 10 cannot physically rotate any longer when the motor 10 is continuously operated in one direction. For convenience in explanation, the present disclosure refers the position, where the motor 10 cannot rotate any longer when the motor 10 is continuously operated in one direction, as the reference point of the motor 10. Such a reference point of the motor 10 may be a position determined in design and manufacturing steps or may be a position corrected through learning during driving.

The storage unit 130 stores the currently-set reference point position information of the motor 10 and can provide the stored reference point position information to the learning unit 140. Moreover, when the learning unit 140 corrects the position of the reference point, the storage unit 130 receives the corrected position of the reference point to update the existing reference point position information.

The learning unit 140 can operate the motor 10 by the driving unit 110, can receive the position change information of the motor 110 from the measurement unit 120 at that time, and can compare the received position information with the existing reference point stored in the storage unit 130 to perform position learning of the motor 10. Moreover, in the case that the position of the reference point of the motor 10 is changed, the learning unit 140 can provide new reference point information to the storage unit 130. Detailed operation of the learning unit 140 will be described with reference to FIG. 3 to FIGS. 5A and 5B.

Hereinafter, a method for using the position learning device 100 illustrated in FIG. 2 to perform position learning of the DCT gear motor 10 will be described in detail.

Figure 3:
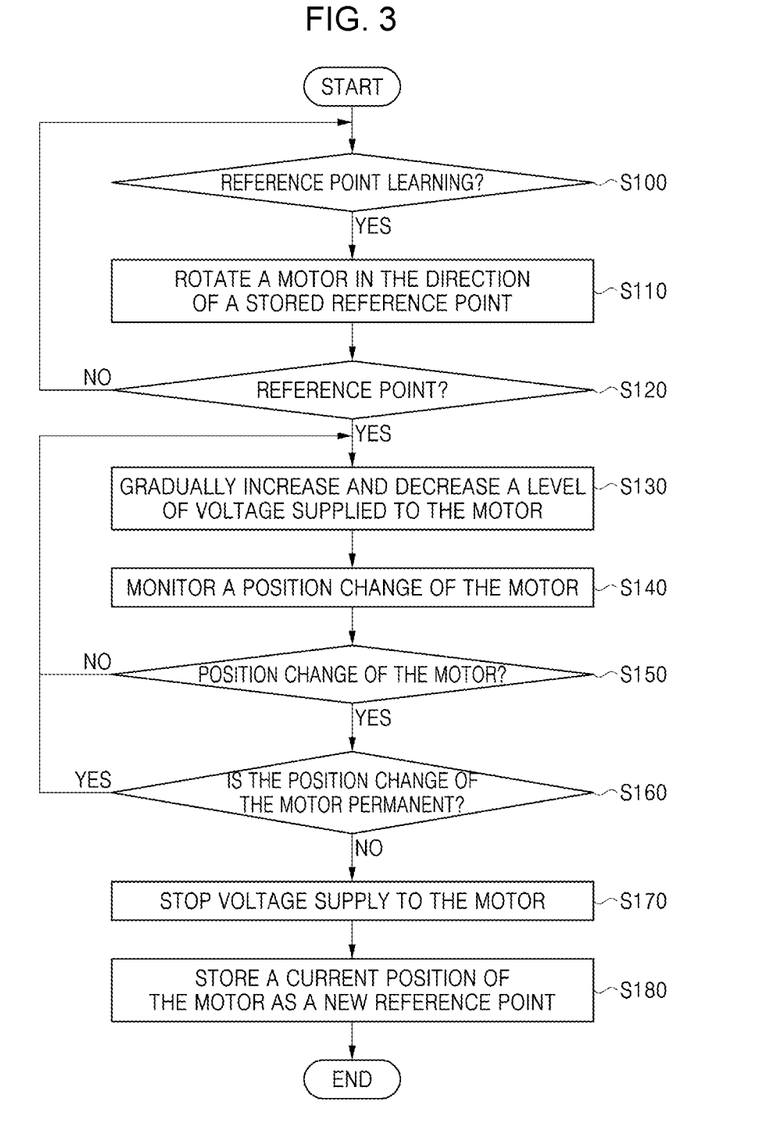
FIG. 3 is a flowchart of steps of using the position learning device of FIG. 1 to learn the position of the DCT motor.

FIG. 3 is a flowchart illustrating steps of the method for using the position learning device 100 illustrated in FIG. 2 to perform position learning of the DCT gear motor 10. FIGS. 4A, 4B, 5A, and 5B are graphs illustrating a position change of the motor in accordance with a level change of applied voltage when performing the steps illustrated in FIG. 3.

With reference to FIG. 3, it is determined first whether to perform reference point learning or not (S100).

The present disclosure performs position learning while operating the motor 10 up to a limit point in one direction. Accordingly, if a vehicle is driving, a shift stage is changed during the position learning, such that an unexpected accident may occur. Accordingly, it is preferred to perform the present disclosure when the vehicle is completely stopped. Accordingly, it is determined in advance whether it is safe even if the position learning is performed.

For example, in the case that a target shift stage is a parking stage (P-stage), it is determined that it is safe even if position learning of the motor 10 is performed. It is because there is no concern that the shift stage will change again during the position learning when the target shift stage is the P-stage. In this case, the position learning of the motor 10 can be set to be always advanced when the target shift stage is changed to the P-stage or can be set to be advanced for a predetermined cycle, for example, once a month. Such a position learning execution cycle can be selected properly as occasion demands.

On the other hand, since the method for learning the position of the motor according to the present disclosure cannot be performed within a relatively short time without changing a shift stage, the method provides advantage of being performed in any time after shift is completed even if a target shift stage is not a P-stage.

Otherwise, position learning of the motor 10 can be advanced only when a separate user input is input. For example, a position learning execution button exists on a user interface UI connected to an engine control unit (ECU) and the position learning of the motor 10 can be set to be performed only when a user presses the button.

When it is determined that it is safe even if position learning of the motor 10 is performed, the motor 10 is operated in the direction of a stored reference point (S110).

The reference point is a value stored in the storage unit 130 and may mean a point where the motor 10 cannot rotate any longer when being continuously operated in one direction. For convenience of description, a reference point stored in the storage unit 130 will be referred to as an existing reference point.

The driving unit 110 can supply the voltage of a constant level to the motor 10 until the motor 10 reaches the existing reference point, and the motor 10 can reach the existing reference point. These are illustrated in first step S11 and second step S12 of FIGS. 4A and 4B. When the driving unit 110 constantly supplies a reference voltage V0 to the motor 10, the motor 10 can rotate in one direction and reach the existing reference point R0.

When the motor 10 reaches the existing reference point R0 (S120), a position change of the motor 10 is monitored (S140) while the level of the voltage supplied to the motor 10 is gradually increased and decreased (S130).

The level of the voltage supplied to the motor 10 relates to driving force rotating the motor 10. In other words, as the voltage supplied to the motor 10 increases, the driving force rotating the motor 10 also increases. However, with continuously supplying the voltage of the same level to the motor 10, a situation that foreign matter goes into the motor 10 or the shift actuator 20, or locking is generated between gear tooth cannot removed. Accordingly, in the present disclosure, with increasing and decreasing the level of the voltage supplied to the motor 10, the driving force of the motor 10 can be changed and effect by foreign matter, gear jam, and the like can be removed therethrough. Such a process is illustrated in a third step S13 of FIGS. 4A and 4B.

Figure 4A:
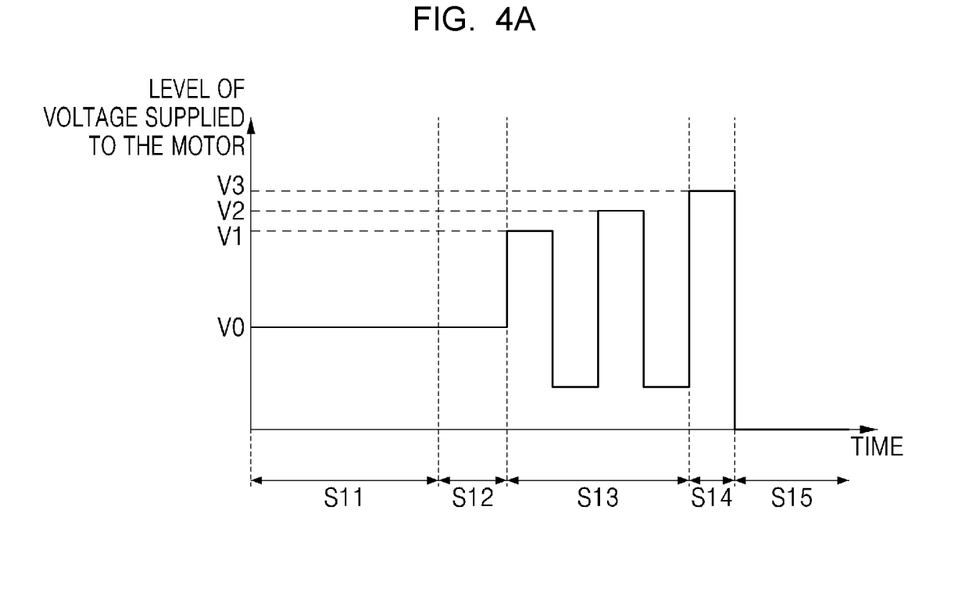
FIG. 4A, FIG. 4B, FIG. 5A and FIG. 5B are graphs illustrating a position change of the motor according to a level change of supplied voltage when the steps of the FIG. 3 are performed.

As illustrated in the third step S13 of FIG. 4A, the motor 10 can be operated for a predetermined time by increasing the voltage supplied to the motor 10 to a higher voltage V1 than a reference voltage V0, can be operated again for a predetermined time with a lower voltage than the reference voltage V0, can be operated for a predetermined time with a higher second voltage V2 than the first voltage V1, and can be operated again for a predetermined time with a lower voltage than the reference voltage V0. In other words, while a process of increasing and decreasing the voltage supplied to the motor 10 is repeated, the voltage is supplied to the motor 10 to allow the level of the increased voltage to be gradually increased. Through this, effect by foreign matter, gear jam, and the like can be completely removed.

On the other hand, gradually increasing the level of the voltage supplied to the motor 10 is sufficient only when being performed in a section in which the level of voltage is higher than a reference voltage V0. As will be described later, the present disclosure aims to generate a displacement in the direction of the existing reference point. Accordingly, the section in which the level of voltage is lower than the reference voltage V0 does not affect position learning. Moreover, since the motor 10 can be rotate in a reverse direction in some cases when the level of voltage is decreased, it is preferred to gradually increase the level of voltage in only a section in which the level of the voltage supplied to the motor 10 is higher than the reference voltage V0.

Figure 4B:
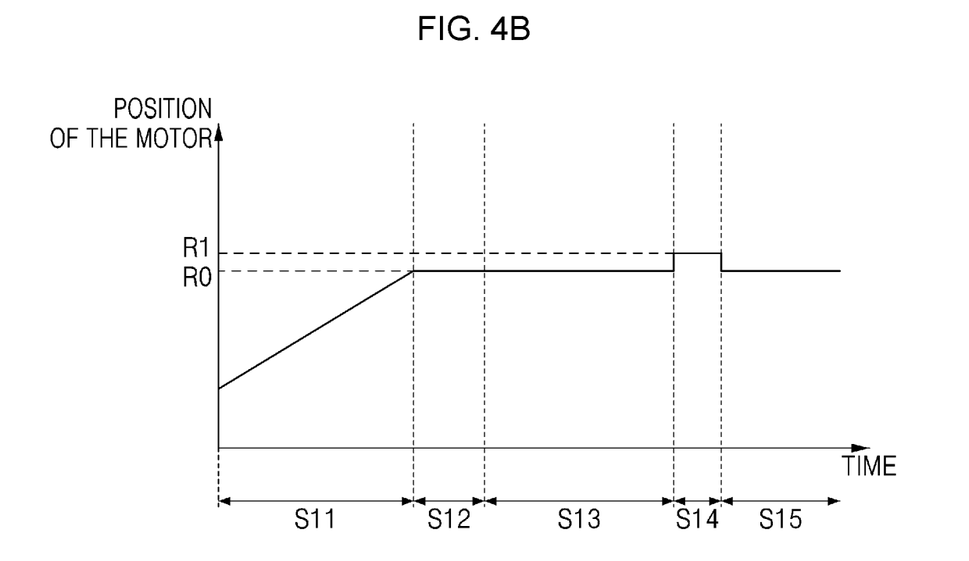

Moreover, in the third step S13, voltage increase and decrease ranges, times and time intervals for repeating increase and decrease voltage, and the like can be selected properly as occasion demands.

The voltage supplied to the motor 10 is continuously increased until a position change is generated in the motor 10 (S150). This is illustrated in the fourth step S14 of FIGS. 4A and 4B.

The position change of the motor 10 illustrated in the fourth step S14 of FIGS. 4A and 4B is removed in the fifth step S15 of interrupting voltage supply to the motor 10. In other words, it means that the displacement of the fourth step S14 is not a permanent displacement. The reason why such a temporary displacement is generated is caused by a compression phenomenon of the motor 10 and gear devices forming the shift actuator 20. In other words, temporary elastic deformation is generated by characteristics of materials. Accordingly, when such a temporary displacement is generated (S160), it can be determined that the motor 10 reaches a limit point where the motor 10 cannot rotate any longer. In this case, the driving unit 110 interrupts voltage supply to the motor 10 and the learning unit 140 can learn the current position of the motor 10 as a new reference point. The learned new reference point may be stored in the storage unit 130 (S180).

The process described with reference to FIGS. 4A and 4B exemplifies a case that a new reference point is same as an existing reference point, i.e., a case that the existing reference point is correct. Different from this, a case that the existing reference point is incorrect may be generated and the case is illustrated in FIGS. 5A and 5B.

Figure 5A:
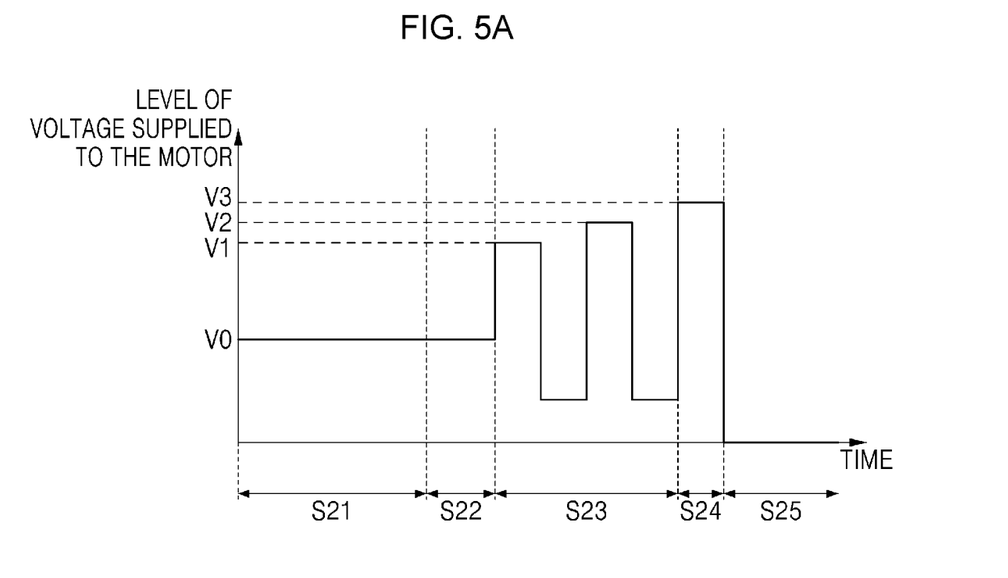
Figure 5B:
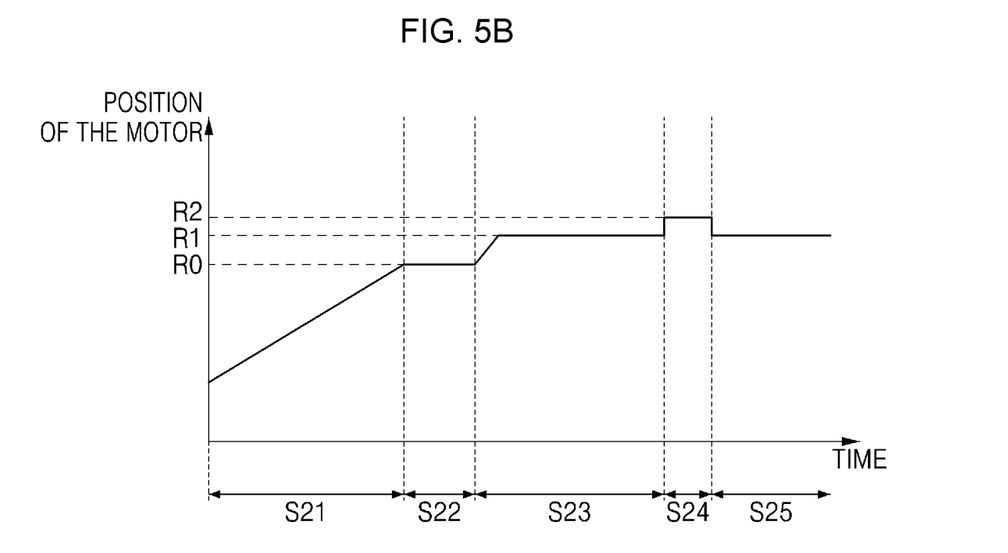

With reference to FIGS. 5A and 5B, the motor 10 can reach up to then existing reference point position R0 through the first step S21 and the second step S22. After this, when the level of the voltage supplied to the motor 10 is gradually increased (Third step, S23), a change (move to a first position R1 is generated in the position of the motor 10. However, different from the case of FIGS. 4A and 4B, even if the voltage supplied to the motor 10 is decreased, the position change can be maintained as it is. In other words, a permanent change is generated. In this case, the voltage is continuously increased and decreased without stopping voltage supply to the motor 10. After this, an additional position change (move to a second position R2 is generated again in the fourth step S24, but is removed together with a voltage decrease (Fifth step, S25). In other words, the temporary displacement is generated in the fourth step and it can be determined that the limit point where the motor 10 cannot rotate any longer is reached.

In this case, the driving unit 110 stops voltage supply to the motor 10 (S170) and the learning unit 140 can learn the current position (First position, R1) of the motor 10 as a new reference point. New reference point position information is transferred to the storage unit 130 to replace the existing reference point position information.

As described above, the method for learning a reference position of a DCT gear motor according to the present disclosure uses the level of the voltage supplied to the motor to perform reference point learning, thereby providing advantage that it is not required to use a separate current sensor. Moreover, the method provides advantage of using only an inexpensive rotation amount sensor to perform the reference point learning. Accordingly, price competitiveness of a product can be increased and reliability can be secured in shift control.

Although the above has been described with reference to the embodiments of the present disclosure, those skilled in the art will be able to variously modify and change the present disclosure without departing from the spirit and scope of the present disclosure as set forth in the claims below.

What is claimed is:

1. A method for learning a position of a DCT gear motor that is configured to rotate to change a shift stage of a DCT gear, the method comprising:
   a first voltage supply step of supplying voltage to the motor to allow the motor to rotate up to a stored reference point;
   a second voltage supply step of repeating a process that increases a level of the voltage supplied to the motor to a higher level than a level of the voltage supplied in the first voltage supply step and decreases the level of the voltage, wherein the voltage is supplied to the motor such that the voltage gradually increases the level of the voltage;
   a step of monitoring a position change of the motor;
   a step of, when a temporary position change is generated in the motor, stopping voltage supply to the motor to remove the temporary position change; and
   a step of setting a current position of the motor as a new reference point.

2. The method of claim 1, wherein the first voltage supply step applies the voltage of a constant level to the motor.

3. The method of claim 2, wherein the voltage supplied to the motor in the second voltage supply step has the same symbol as that of the voltage supplied to the motor in the first voltage supply step.

4. The method of claim 1, wherein the decreased level of the voltage in the second voltage supply step is constantly maintained.

5. The method of claim 1, wherein the step of monitoring the position change of the motor measures a relative rotation amount of the motor to the stored reference point.

6. The method of claim 1, further comprising:
   a third voltage supply step of repeating a process that, when a permanent position change is generated in the motor, increases the level of the voltage supplied to the motor to a higher level than the level of the voltage applied in the second voltage supply step and decreases the level of the voltage, wherein the increased level of the voltage is supplied to the motor to be gradually increased, wherein the third voltage supply step is maintained until a temporary position change is generated in the motor.

7. The method of claim 1, further comprising:
   a safety determination step of determining whether it is safe to perform reference point learning of the motor.

8. The method of claim 7, wherein, when a target shift stage is a P-stage, the safety determination step determines that it is safe to perform the reference point learning of the motor.

* * * * *